US006047335A

United States Patent [19]

Takizawa

[11] Patent Number: 6,047,335

[45] Date of Patent: *Apr. 4, 2000

[54] VIDEO DISPLAY DEVICE APPLIED FOR A GRAPHICS ACCELERATOR

[75] Inventor: Tetsuro Takizawa, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/918,008

[22] Filed: Aug. 27, 1997

[30] Foreign Application Priority Data

Aug. 28, 1996 [JP] Japan .................................... 8-227133

[51] Int. Cl.[7] ...................................................... G06F 13/00

[52] U.S. Cl. .............................. 710/22; 711/203; 345/501

[58] Field of Search .................................... 395/200, 166, 395/842; 345/508, 512, 501, 507, 511, 515, 517, 521–526; 710/22–28, 31–35; 711/200–209

[56] References Cited

U.S. PATENT DOCUMENTS

| | | | |
|---|---|---|---|
| 4,837,710 | 6/1989 | Zelinsky et al. | 364/521 |
| 5,313,577 | 5/1994 | Meinerth et al. | 395/166 |
| 5,321,806 | 6/1994 | Meinerth et al. | 395/162 |
| 5,748,983 | 5/1998 | Gulick et al. | 395/842 |
| 5,781,927 | 7/1998 | Lsu et al. | 711/151 |
| 5,787,267 | 7/1998 | Leung et al. | 395/432 |
| 5,835,729 | 11/1998 | Moreton et al. | 395/200.76 |
| 5,838,336 | 11/1998 | Ross | 345/508 |
| 5,845,327 | 12/1998 | Rickard et al. | 711/146 |
| 5,854,639 | 12/1998 | Miyoshi | 345/512 |
| 5,859,651 | 1/1999 | Potu | 345/526 |
| 5,898,892 | 4/1999 | Gulick et al. | 395/872 |

*Primary Examiner*—Christopher B. Shin
*Attorney, Agent, or Firm*—Foley & Lardner

[57] ABSTRACT

To provide a video display device which can display video data on a display screen even when there is no or insufficient idle space in a frame buffer (41), a video display device according to the invention of a graphics accelerator (40) comprises a DMA controller (44) for reading out video data prepared in a main memory (50), and video data processing section (45) for processing the video data to be displayed on a display device (60).

7 Claims, 6 Drawing Sheets

VIDEO DISPLAY DEVICE APPLIED FOR A GRAPHICS ACCELERATOR

BACKGROUND OF THE INVENTION

The present invention relates to a video display device, and particularly to a video display device preferably applied for a graphics accelerator to be used for displaying a video picture on a computer display.

There have been used video display devices such as illustrated in FIG. 5 or FIG. 6.

A prior video display device 1, illustrated in FIG. 5, comprises a frame buffer 2 for buffering graphics display data of a computer, a memory control section 3 for controlling data read/write of the frame buffer 2, a video data processing section 4 taking charge of video data processing such as color space conversion or picture size magnification/demagnification for generating video picture data from video data, and a display control section 6 for generating display signals to be displayed on a screen of a display device 5 according to the graphics display data and the video picture data.

In the prior art of FIG. 5, the video data are stored in an idle memory space, wherein the display data are not stored, of the frame buffer 2. The video data stored therein are read out by the memory control section 3, processed with the video data processing by the video data processing section 4 into the video picture data and displayed after synthesized with the graphics display data prepared in the frame buffer 2.

In the prior art of FIG. 6 having a similar configuration with the prior art of FIG. 5, the video picture data after processed in the video data processing section 4 are written in a part of the effective space of the frame buffer 2 to be synthesized with graphics display data prepared therein, and the data synthesized with the graphics display data and the video picture data are read out from the effective space to be displayed.

However, with the video display device 1 according to the prior of FIG. 5 or the prior art of FIG. 6, the video data can not be displayed when there is no or insufficient idle space in the frame buffer 2 for buffering the video data.

This is a problem.

SUMMARY OF THE INVENTION

Therefore, a primary object of the present invention is to provide a video display device which can display video data on a display screen, even when there is no or insufficient idle space in a frame buffer provided for buffering data to be displayed on the display screen.

In order to achieve the object, a video display device according to the invention, to be applied in a computer, comprises main memory reading means for reading out video data prepared in a main memory of the computer, and video data processing means for processing the video data to be displayed on a display device of the computer by way of a display control means provided in the computer.

Therefore, the video display device according to the invention can display video data on a display screen even when there is no or insufficient idle space in a frame buffer of the computer provided for buffering data to be displayed on the display screen.

The main memory reading means read out the video data from the main memory preferably according to a DMA (Direct Memory Access) transfer system. Therefore, data transfer of the video data can be performed in a high-speed independent of processings performed by a CPU (Central Processing Unit) of the computer.

For the purpose, the main memory reading means refers to an address table showing correspondence between a physical address of the main memory divided into pages assigned to the main memory reading means and its logical address indicating address difference counted sequentially from a beginning of the main memory divided in the pages. So, physical address of desired data in the main memory can be obtained reliably and swiftly.

The video display device may further comprise main memory writing means for writing video data, preferably according to the DMA transfer system, into the main memory of the computer.

The display control means generate display signals for driving the display device according to data synthesized from the video data after processed by the video data processing means together with display data prepared in a frame buffer provided in the computer. When there is no video data to be displayed, only the ordinary display data prepared in the frame buffer.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
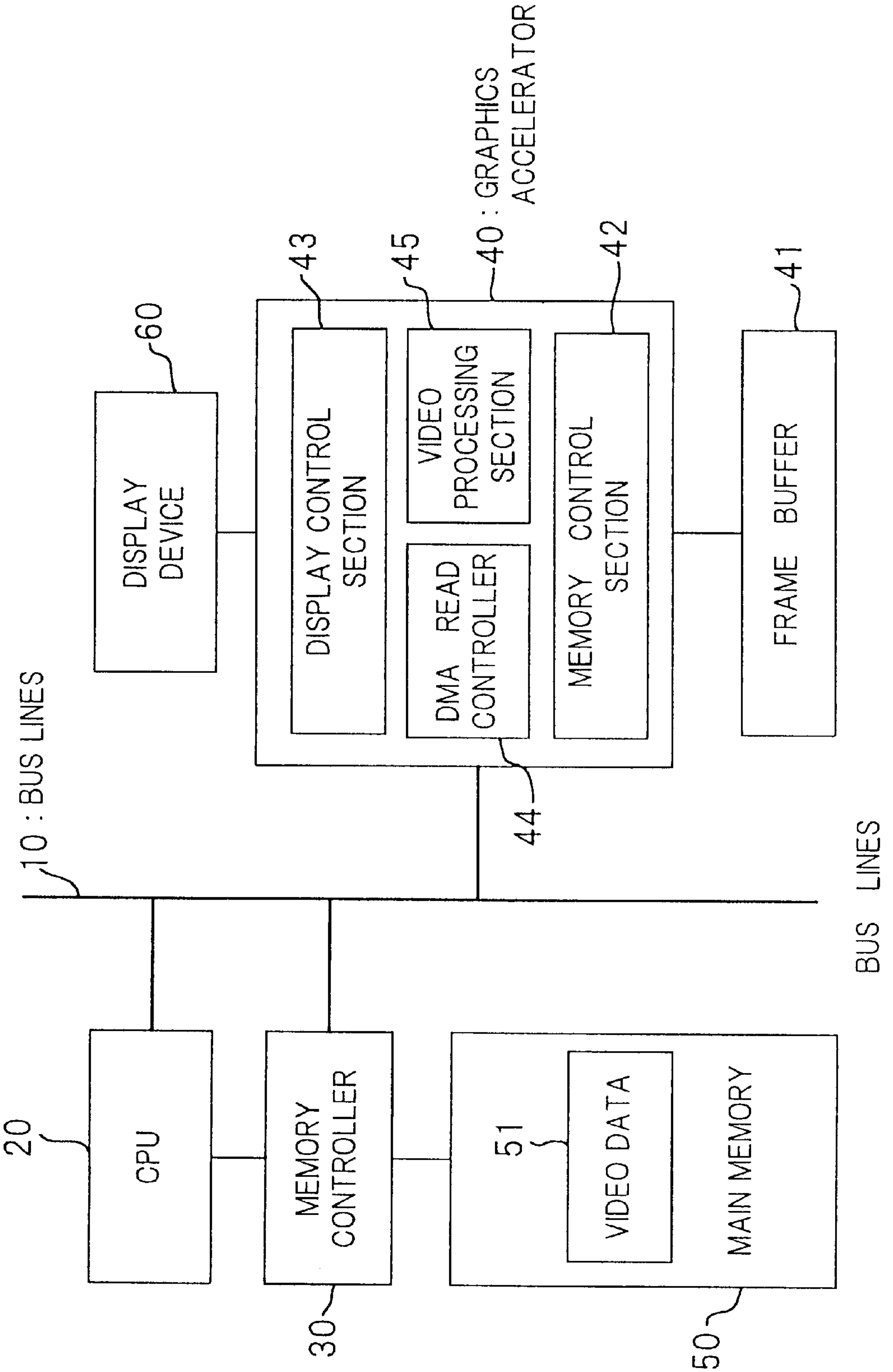
FIG. 1 is a block diagram illustrating a video display device applied for a graphics accelerator 40 in a computer system.

FIG. 1 is a block diagram illustrating a video display device applied for a graphics accelerator 40 in a computer system.

To bus lines 10 of the computer system, there are connected a CPU 20, a memory controller 30 and a graphics accelerator 40. A main memory 50 is controlled by the memory controller 30, through which the main memory so is accessed by the CPU 20. The graphics accelerator 40, provided with a frame buffer 41, comprises a memory control section 42 for controlling data read/write of the frame buffer 41 and a display control section 43 for generating display signals to be displayed on a screen of a display device 60, whereon are displayed, in general, display signals generated by the display control section 43 according to graphics display data which are written by the memory control section 42 in the frame buffer 41 supplied from the CPU 20, and read out also by the memory control section.

Here, in the embodiment, the graphics accelerator 40 further comprises a video display device which includes a DMA (Direct Memory Acess) read controller 44, taking charge of main memory reading operations, for reading video data 51 out of the main memory 50 by way of the bus lines 10, and a video processing section 45, taking charge of video data processing operations, for performing video data processing of the video data 51 such as color space conversion or picture size magnification/demagnification, since, in general, the video data 51, prepared by the CPU 20 in memory spaces of the main memory 50, have a different data format with that of graphics display data prepared in the frame buffer 41 and a different picture size with that to be displayed on the display device 60.

Now, operation of the embodiment is described.

The DMA read controller 44 sends a read request to the memory controller 30 for reading out the video data 51 to be displayed on the display device 60. Then, through a fixed procedure, use of address and data lines of the main memory 50 is assigned to the DMA read controller 44 apart from the CPU 20, enabling the DMA read controller 44 to read out the video data 51 from the main memory 50. The video data 51 read out from the main memory 50 are processed by the video processing section 45 into video picture data to be converted into display signals for driving the display device 60 by the display control section 43.

Figure 2:
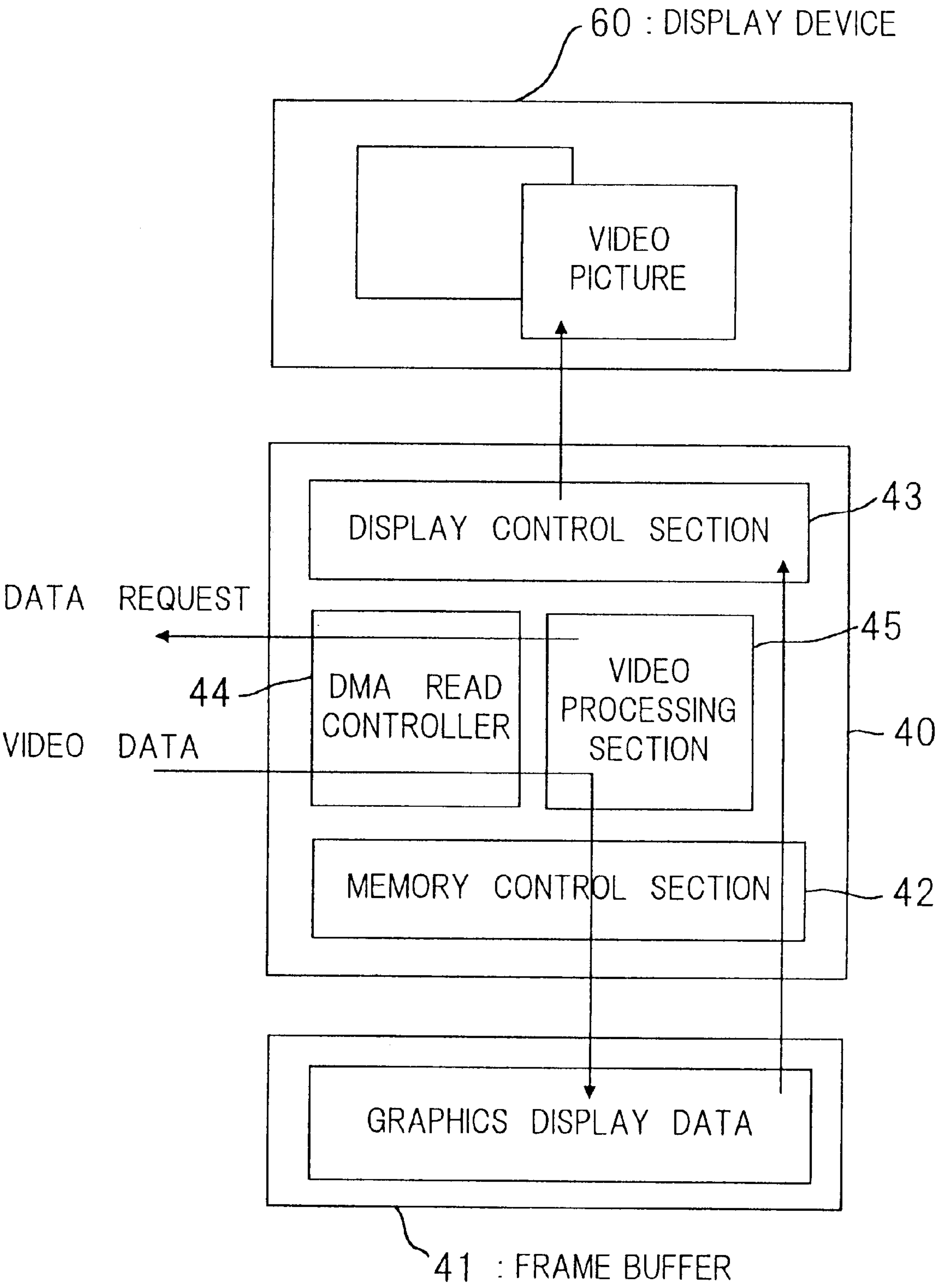
FIG. 2 is a schematic diagram illustrating flows of video data 51 shown by arrow signs.

FIG. 2 is a schematic diagram illustrating flows of the video data 51 shown by arrow signs.

Notified from the CPU 20 that video data are prepared in the main memory 50, the video processing section 45 demands data read to the DMA read controller 44, indicating offset address, where desired video data are written, from beginning of the video data. The DMA read controller 44 demands data read to the memory controller 30 through the bus lines 10 with physical address of the main memory 50 corresponding to the offset address.

Obtaining the video data 51 read out by the memory controller 30 with the physical address, the DMA read controller 44 transfers the video data 51 to the video processing section 45. The video processing section 45 performs the video data processing above described on the video data 51 and stores them through the memory control section 42 in appointed addresses of the frame buffer 41, from where display data are read out sequentially to be converted by the display control section 43 into the display signals for driving the display device 60.

The use of the address and data lines are returned from the DMA read controller 44 to be re-assigned to the CPU 20 when data read of the video data 51 is accomplished.

Here, it should be noted that the video data 51 are not always prepared in a continuous memory space of the main memory 50. Generally, memory space of the main memory 50 is divided into small units named pages, and the CPU 20 fetches and releases the main memory 50 by pages. Therefore, necessary number of pages can be assigned for data larger than a page, but the assigned pages are not ensured to be consecutive.

Figure 3:
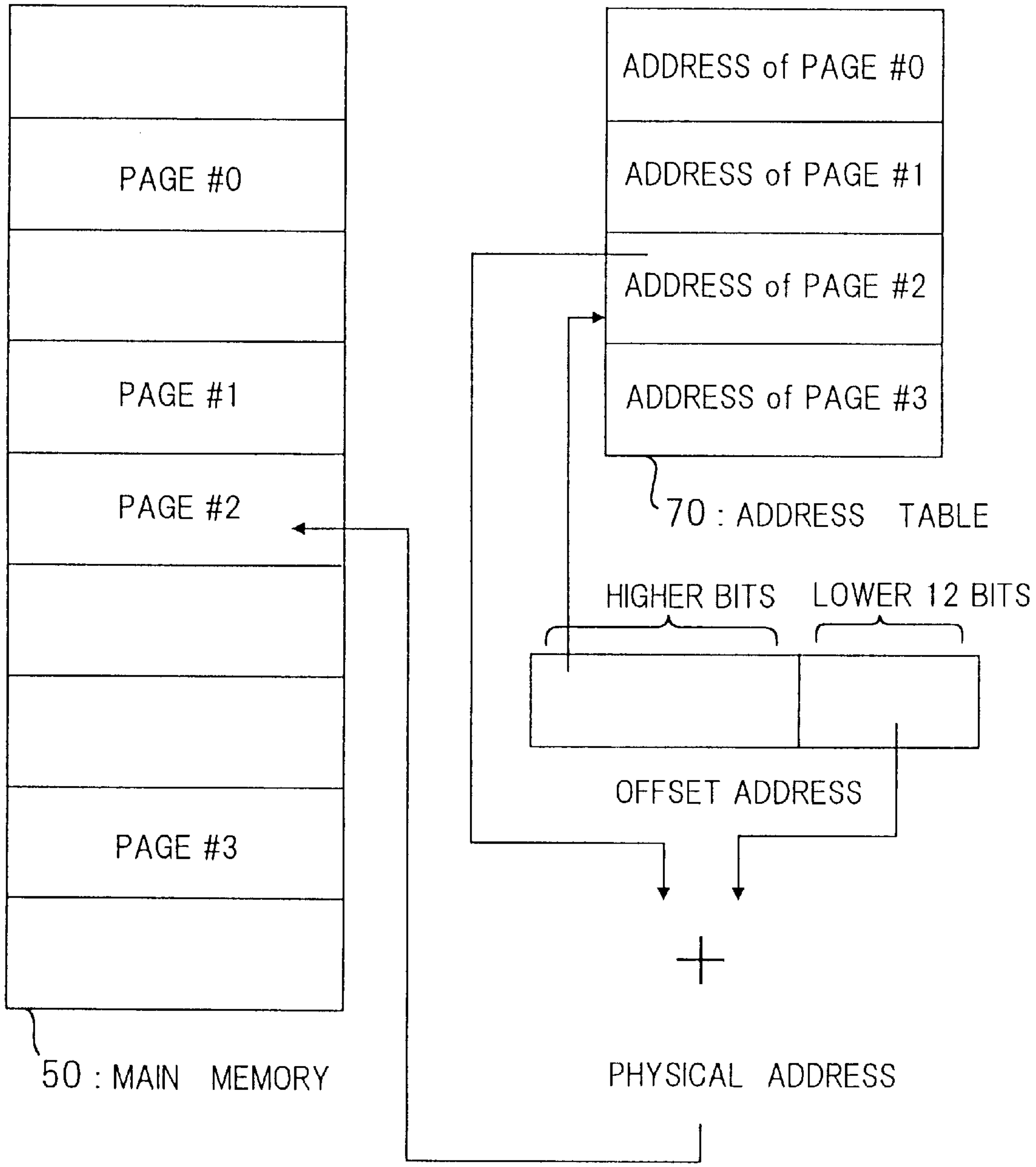
FIG. 3 illustrates address table 70 and the main memory 50 divided into pages indicated by the address table 70.

Therefore, the DMA read controller 44 of the embodiment is provided with an address table 70 as illustrated in FIG. 3, for enabling a constant read-out of the video data 51, wherein is stored correspondence between physical address of each assigned page and its logical address indicating address difference counted sequencially from the beginning of the assigned memory space. Referring to the address table 70, the DMA read controller 44 obtains a physical address of the main memory 50 corresponding to the offset address from the beginning of the video data 51 designated by the video processing section 45.

Referring to FIG. 3, a beginning physical address of each page is written in corresponding entries of the address table 70. So, when memory space of a page is 4K bytes, the beginning physical address of a page, wherein data of an offset address is written, is to be stored in the entry indicated by upper bits other than lower 12 bits of the offset address. Therefore, a physical address of desired data can be obtained by chaining binary value stored in the entry indicated by the upper bits together with lower 12 bits of the offset address.

Thus, the video data 51 can be sought constantly independent of their offset address value, data size, or the page size, in the embodiment.

In the above embodiment, the video data 51 is described to be prepared by the CPU 20, but the video data may be supplied from outside of the computer.

Figure 4:
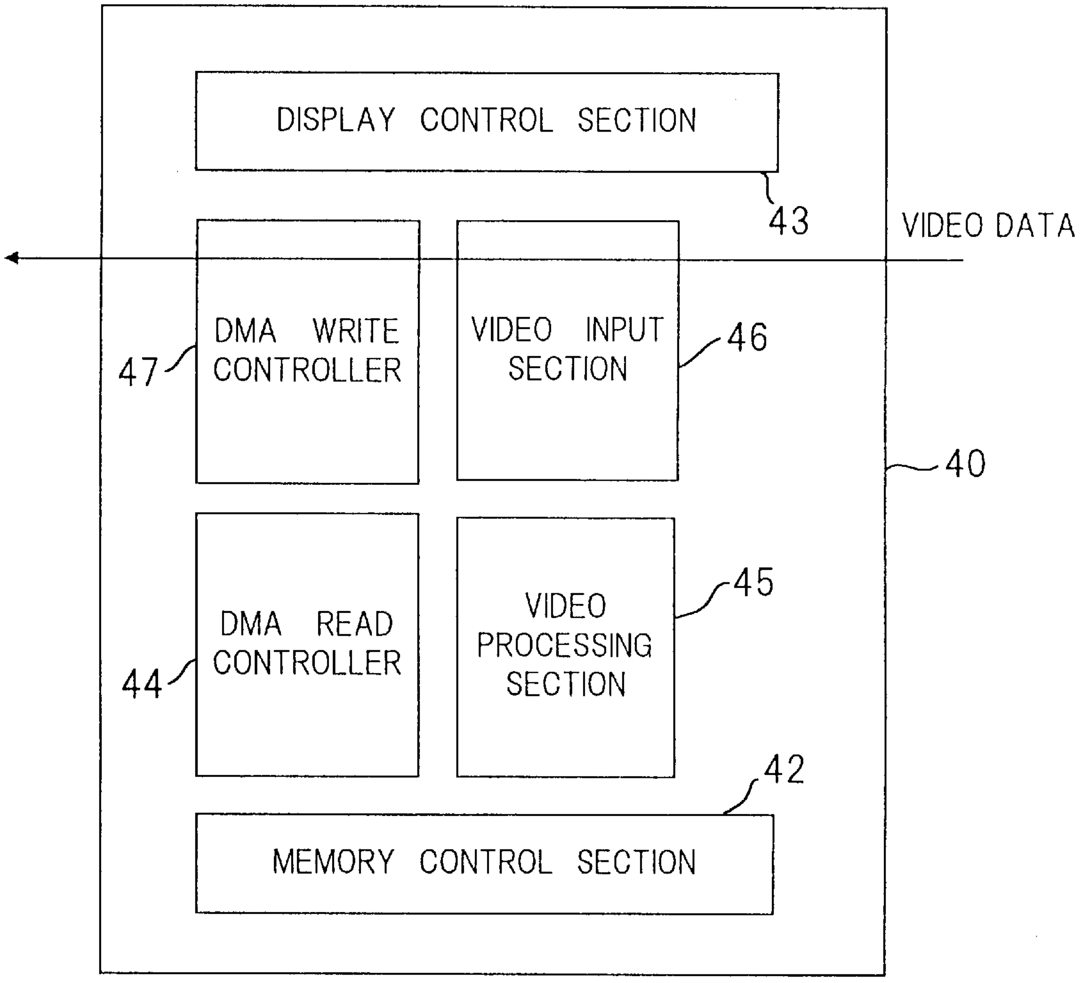
FIG. 4 is a schematic diagram illustrating configuration of a graphics accelerator 40 according to another embodiment of the invention.
Figure 5:
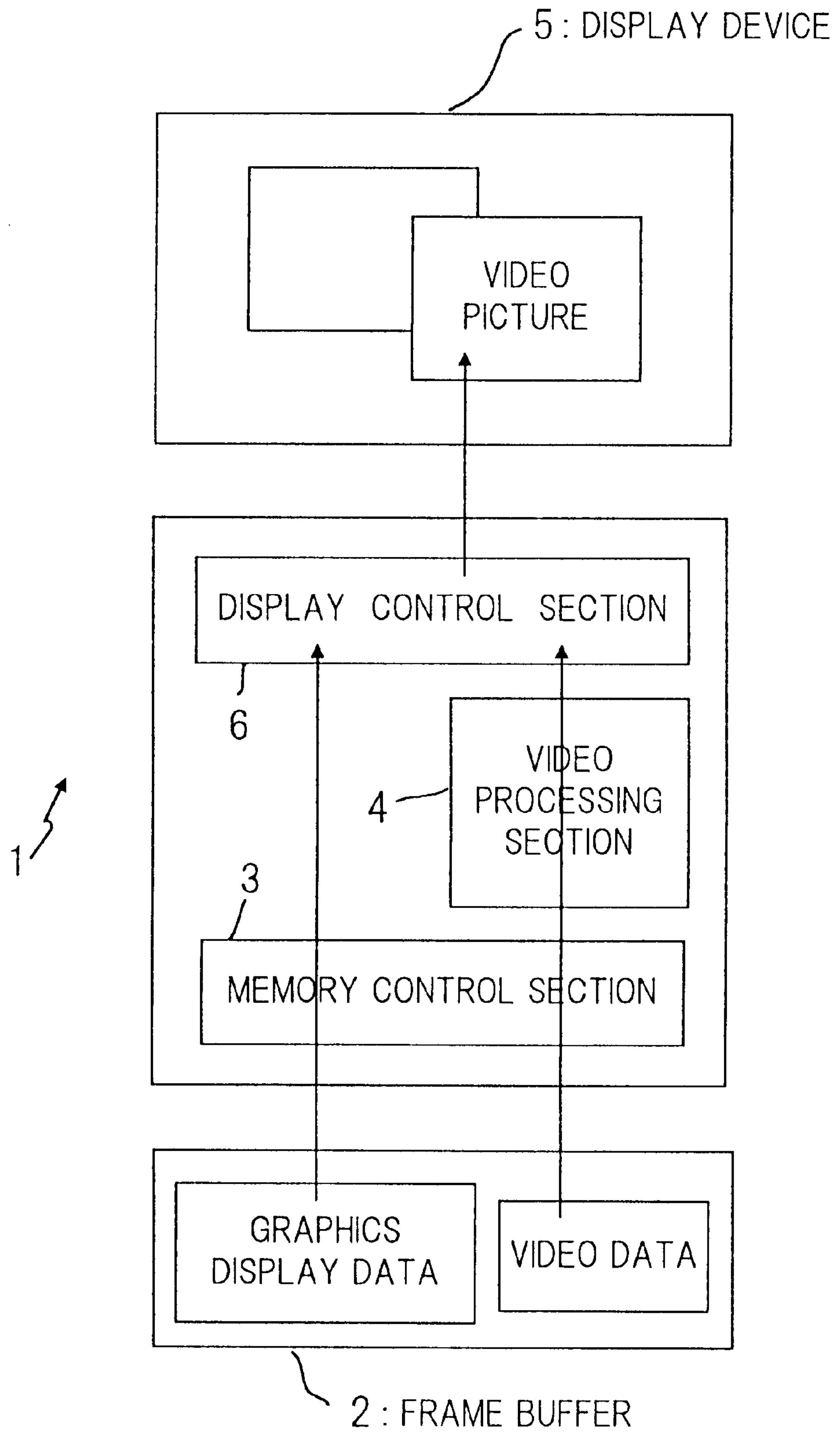
FIG. 5 PRIOR ART
FIG. 5 is a block diagram illustrating a prior video display device.
Figure 6:
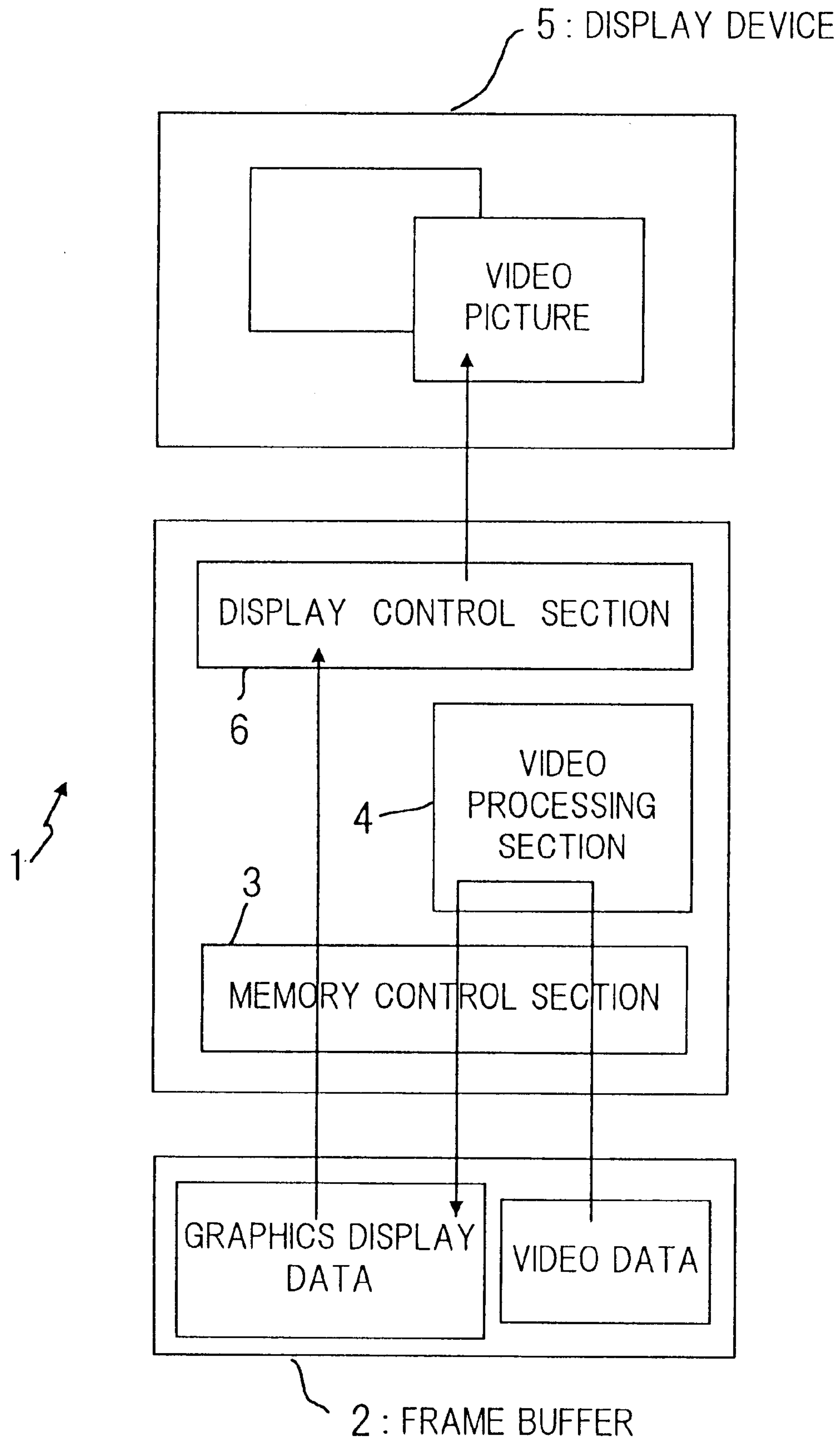
FIG. 6 PRIOR ART
FIG. 6 is a block diagram illustrating another prior video display device.

FIG. 4 is a schematic diagram illustrating configuration of a graphics accelerator 40 according to another embodiment to be applied when the video data are supplied from outside.

In the embodiment of FIG. 4, there are further provided a video input section 46 where the video data are supplied, and a DMA write controller 47 for controlling data-write of the video data transferred from the video input section 46.

When video data are input and transferred to the DMA write controller 47, it generates addresses of the main memory 50 where the video data are to be written, scanning the address table 70 of FIG. 3 sequentially from the beginning. Beginning data of each frame of the video data are written in the page registered in the first entry of the address table 70. Value of lower 12 bits of the physical address, for example, is incremented sequentially in the page until it arrives to the end of the page, then upper bits of the physical address are replaced with value registered in the following entry of the address table 70, repeating the same.

With the physical addresses thus generated, the DMA write controller 47 requests data-write to the memory controller 30 of FIG. 1 and transfers the video data to the memory controller 30 by way of the bus lines 10. When video data of one frame are supplied, the video input section 46 notifies it to the video processing section 45. Then, the video data are processed and displayed on the display device 60 in the same way as previously described in connection with FIG. 2, where the video data are prepared by the CPU 20.

The video picture data may be displayed independently, but usually they are displayed synthesized with graphics display data. As for synthesizing the video picture data and the graphics display data, the video display data after the video data processing may be synthesized by writing them in the frame buffer 41 where the graphics data are already prepared, or they may be synthesized by the display control section 43 with the graphics data read out of the frame buffer 41.

As heretofore described, the video display device according to the invention, to be preferably applied in a graphics accelerator 40 having a frame buffer 41 for buffering graphics display data, a memory control section 42 for controlling data read/write of the frame buffer 41, a display control section 43 for generating display signals to be displayed on a display device 60, comprises the DMA read controller 44 for reading out video data 51 prepared in a main memory 50 of a computer through bus lines 10, and the video processing section 45 for performing video data processing of the video data 51 such as color space conversion or picture size magnification/demagnification. Therefore, the video display device according to the invention can display video data even when there is but insufficient memory space in the frame buffer 41, making use of the main memory 50.

What is claimed is:

1. A method of displaying data in a data processing system having a main memory, a memory controller, a video display device, and a computer; said method comprising the steps of:

a) sending out, by a DMA read controller of the computer, a read request to the memory controller for reading video data stored in the main memory to be displayed on the video display device, the read request being sent out based on a demand for video data from a video processing unit of the computer, the demand indicating an offset address starting from a beginning address of a region in the main memory where the video data is current stored;

b) reading out, by the DMA read controller after gaining control of a bus connecting the DMA read controller and the main memory, the requested video data from the main memory;

c) transferring the requested video data from the DMA read controller to the video processing unit;

d) processing, by the video processing unit, the requested video data into video picture data;

e) storing the video picture data in a frame buffer using a memory control unit of the computer to determine address locations for the storing the video picture data in the frame buffer; and f) sequentially reading out the video picture data stored in the frame buffer, wherein the read out video picture data is converted by a display control unit of the computer into display signals for driving the video display device.

2. The method recited in claim 1, wherein the video data are not stored in a continuous memory space of the main memory, wherein the main memory address space is divided into units of pages.

3. The method recited in claim 1, wherein the DMA read controller includes an address table for enabling a constant read-out of the video data from the main memory, the address table storing a correspondence between a physical address of each assigned page and a logical address indicating an address difference counted sequentially from a beginning of an assigned memory space of the video data stored in the main memory.

4. The method recited in claim 3, wherein the DMA read controller obtains a physical address of the main memory corresponding to the offset address from the beginning of the assigned memory space of the video data stored in the main memory as provided to the DMA read controller by the video processing unit.

5. A video display device applied in a computer; said video display device comprising:

main memory reading means for reading out video data prepared in a main memory of the computer; and video data processing means for processing said video data to be displayed on a display device of the computer by way of a display control means provided in the computer, wherein said main memory reading means refers to an address table showing correspondence between a physical address of said main memory divided into pages assigned to said main memory reading means and a logical address indicating address difference counted sequentially from a beginning of said main memory divided in said pages, said address difference corresponding to a predetermined number of upper bits of the physical address.

6. A video display device applied in a computer; said video display device comprising:

main memory reading means for reading out video data prepared in a main memory of the computer; and video data processing means for processing said video data to be displayed on a display device of the computer by way of a display control means provided in the computer, wherein said display control means generates display signals for driving said display device according to data synthesized from said video data after being processed by said video data processing means together with display data prepared in a frame buffer provided in the computer, wherein said video data is processed by said video data processing means prior to said video data being stored in said frame buffer.

7. In a data processing system having a CPU, a main memory, a memory controller, and a video display device; said video display device comprising:

a main memory address generation unit for generating a main memory physical address from a main memory logical address;

a main memory reading unit for reading out video data prepared in a main memory of the computer at the physical address generated by said main memory address generation unit; and a video data processing unit for processing said video data to be displayed on a display device of the computer by way of a display control unit provided in the computer, wherein said main memory address generation unit includes an address table showing correspondence between a physical address of said main memory divided into pages assigned to said main memory reading unit and a logical address indicating address difference counted sequentially from a beginning of said main memory divided in said pages, said address difference corresponding to a predetermined number of upper bits of the physical address.

* * * * *